(12) United States Patent
Badalament

(10) Patent No.: US 7,575,214 B2
(45) Date of Patent: Aug. 18, 2009

(54) OMNIPOSITIONAL CABLE-SUSPENSION SYSTEM

(76) Inventor: Richard Badalament, 45 Erland Rd., Stony Brook, NY (US) 11790

( * ) Notice: Subject to any disclaimer, the term of this patent is extended or adjusted under 35 U.S.C. 154(b) by 592 days.

(21) Appl. No.: 11/377,603

(22) Filed: Mar. 16, 2006

(65) Prior Publication Data

US 2006/0214078 A1   Sep. 28, 2006

(51) Int. Cl.
*A47H 1/10* (2006.01)
(52) U.S. Cl. ............ 248/328; 248/550; 248/610; 24/129 R; 40/601
(58) Field of Classification Search .............. 248/550, 248/610, 328; 40/601; 24/129 R, 115 H, 24/129 A, 129 D; 294/82.14; 348/144
See application file for complete search history.

(56) References Cited

U.S. PATENT DOCUMENTS

| | | | | | |
|---|---|---|---|---|---|
| 275,899 | A | * | 4/1883 | Forster | 297/276 |
| 2,273,136 | A | * | 2/1942 | Orech et al. | 224/258 |
| 3,094,755 | A | * | 6/1963 | Casanave | 24/129 R |
| 3,328,033 | A | * | 6/1967 | Hendry | 473/184 |
| 3,631,570 | A | * | 1/1972 | Coleman | 24/129 R |
| 4,105,349 | A | * | 8/1978 | Kupperman et al. | 403/209 |
| 4,220,306 | A | * | 9/1980 | Cueto et al. | 248/328 |
| 4,349,139 | A | * | 9/1982 | Oishi | 224/257 |
| 4,425,388 | A | * | 1/1984 | Oppenheimer, Jr. | 428/16 |
| 4,710,819 | A | | 12/1987 | Brown | |
| 5,351,367 | A | * | 10/1994 | Kennedy et al. | 24/129 R |
| 5,423,142 | A | * | 6/1995 | Douglas et al. | 40/605 |
| 5,568,189 | A | | 10/1996 | Kneller | |
| 5,895,893 | A | * | 4/1999 | McMillian | 177/126 |
| 5,916,328 | A | * | 6/1999 | Pritschow et al. | 74/490.03 |
| 6,026,545 | A | * | 2/2000 | Duggan | 24/265 AL |
| 6,473,944 | B1 | * | 11/2002 | Vazin | 24/129 R |
| 6,566,834 | B1 | * | 5/2003 | Albus et al. | 318/568.2 |
| 6,675,447 | B1 | * | 1/2004 | Hofeldt | 24/129 R |
| 7,088,071 | B2 | * | 8/2006 | Rodnunsky | 318/649 |
| 7,117,620 | B2 | * | 10/2006 | Tolna | 40/601 |
| 7,150,757 | B2 | * | 12/2006 | Fallin et al. | 606/232 |
| 2004/0034972 | A1 | * | 2/2004 | Brown | 24/129 R |
| 2005/0001136 | A1 | | 1/2005 | Fleishman | |
| 2005/0024005 | A1 | | 2/2005 | Rodnunsky et al. | |
| 2005/0183245 | A1 | * | 8/2005 | Whipple | 24/129 R |
| 2007/0101554 | A1 | * | 5/2007 | O'Brien | 24/129 R |

* cited by examiner

*Primary Examiner*—J. Allen Shriver, II
*Assistant Examiner*—Michael McDuffie
(74) *Attorney, Agent, or Firm*—Alfred M. Walker

(57) ABSTRACT

An omnipositional cable-suspension system suspends an inanimate object. A pair of spaced apart holes pass through the object. A first closed cable loop passes through both of the holes and a first hooking point, so that a first cable is movable within the holes. A second closed cable loop passes through both of these holes and to a second hooking point, so that the second cable is also movable within the holes. The inanimate object can be moved from one position to another, while the object remains stable in any position so placed. This omnipositional cable-suspension system enables the suspension of any inanimate object (the "object") that can be readily moved to any position about its three-dimensional axis without changing the cable-suspension system of the object. The object can be repositioned to any other stationary position as many times as desired.

15 Claims, 5 Drawing Sheets

OMNIPOSITIONAL CABLE-SUSPENSION SYSTEM

FIELD OF THE INVENTION

The present invention relates to suspending inanimate objects in a stable position.

BACKGROUND OF THE INVENTION

Among related patents include U.S. Pat. Nos. 4,625,938 and 4,710,819 both of Brown, as well as U.S. Pat. No. 6,809,495 of Rodnunsky.

As noted in its Abstract, Brown '819 describes a suspension system for supporting and conveying equipment, such as a camera assembly, which includes at least three flexible members, spaced-apart mounting drums for extendably and retractably supporting the flexible members and an equipment support member including an inner section to which the equipment is attached and an outer section connected to the flexible members. The inner and outer sections of the equipment support member are rotatable relative to each other about at least two separate axis of rotation. Preferably the mounting drums for the flexible members are operated by a computer-controlled drive to permit an operator to selectively extend and/or retract one or more of the flexible members to achieve the desired movement of the supported equipment.

In Rodnunsky '495 objects are moved throughout three-dimensional space by using two supporting ropes each of which connects to both opposing sides of the payload. If one rope breaks, the payload gently travels to the middle of the coverage area in a safe manner, maintaining the given displacement in the other unbroken axis. In addition, since the ropes are commanded from one point, distantly located motors and electrical cables are not required. Many types of useful devices may then be attached to the platform including devices that require external power or devices that possess their own power and are operated via wireless signals.

Objects of the Invention

This omnipositional cable-suspension system enables the suspension of any inanimate object (the "object") that can be readily moved to any position about its three-dimensional axis without changing the cable-suspension system of the object. The object can be repositioned to any other stationary position as many times as desired. The inanimate object can be moved from one position to another, while the object remains stable in any position so placed.

Other objects which become apparent from the following description of the present invention.

SUMMARY OF THE INVENTION

An omnipositional cable-suspension system suspends an inanimate object. A pair of spaced apart holes pass through the object. A first closed cable loop passes through both of the holes and a first hooking point, so that a first cable is movable within the holes. A second closed cable loop passes through both of these holes and to a second hooking point, so that the second cable is also movable within the holes. The inanimate object is moved from one position to another, while the object remains stable in any position so placed.

The steps for implementing the cable-suspension system of the present invention are as follows:

1. Two holes are drilled in the object to be suspended (as in FIG. 1). The holes should be located towards the opposite ends of the object. Precise location of the holes does not matter. (For example, in the case of a six inch rectangular wooden bar, measuring about ½ inch in width and about ¾ inch in height, each hole might be positioned about ½ inch from its respective end.) The ends of the holes can be beveled to reduce friction and facilitate positioning of the object.

2. Two (2) loops of cabling (the "loops") are required to suspend the object (see FIG. 1). The cabling can be made of any material (steel, nylon, cotton fiber, etc.) with the diameter appropriate for support of the object, which may be large or small. The loops can be of equal length or differ in length.

3. Each loop is then hooked, or otherwise attached to a "hooking point" as depicted in FIG. 1. The distance between the hooking points can be varied as desired. The hooking points need not be on the same horizontal plane(s) or vertical plane(s) as one another. Once the object is suspended, it can be easily repositioned as many times as desired, and as often as desired, without changing the suspension system.

4. Steps 1, 2 and 3 are repeated for each additional object to be suspended.

When multiple objects are used, varying the lengths of the loops used to suspend each object enables the desired effect of creating aesthetically pleasing visual patterns among the objects used. This effect can be enhanced by varying the locations (horizontally, vertically, and in terms of relative height) of the hooking points used to suspend the object(s). Multiple objects can all be suspended from the same two hooking points, from two separate hooking points for each object, or from a combination and shared and separate hooking points for the objects, provided that the two loops for a given object are not attached to the same hooking point (see FIG. 1).

Stoppers in the shape of the beveled or unbeveled holes, made of cork or other material can be incorporated to hold the object at the positioning points relative to any direction on the three-dimensional axis of the object. Clamping the cable at the object may also be employed.

Motors or other mechanisms can be employed at the hooking point(s) to change the length of a given loop or to run a portion of cabling through or over the hooking point to mechanically change the positioning of a given object on command or at predetermined and preset intervals. Cable loops are just for re-positioning objects, not for moving the object.

Ornamentation of the object or objects used can vary to suit the user. It is anticipated that variables, such as color, texture, materials, shape, symbols, and patterns of design would be employed as desired.

Applications

This omnipositional cable-suspension system has many varied uses, which include but are not limited to: artistic, recreational, educational, organizational, presentational, and therapeutic uses. Some examples are:

1. The suspension of multiple large objects to form a mutable sculpture or mobile to hang in the lobby or other common area of a building.

2. A means for educators to help students explore concepts of various mathematical relationships. Educators might utilize a kit which would include a display enclosure for demonstration purposes.

3. A toy, arts and crafts kit, or hobbyist's kit. The kit can be (a) fully or partially assembled by the purchaser and (b) used to suspend multiple cylinders, blocks, pipes, or other objects, which would be (c) made of wood, metal, plastic or some combination of these or other materials, and (d) either of unified shape or of various shapes and (5) either of unified dimension of varied dimensions, and would include (6) a length of cabling material made of steel, nylon, cotton fiber or some combination of these or other materials which would either come already attached to the objects or be cut by the user to desired lengths for loops.

This item might have a name such as "Twiddle Sticks", "Suspendy Blocks", "Suspendy Builders", "Suspendy Bars", "Suspendy Things", or "Omnibars", and might be described in the packaging as a construction system "from the ceiling down", if designed to be suspended from a ceiling.

4. An executive's recreational tool. This would be constructed in a size or sizes suitable for desktop use, and made of wood, metal, plastic or some combination of these or other materials. This item might be inscribed with a motivational slogan such as "Create Change".

5. A sculpture for a baby's nursery. This unit could be used to suspend multiple objects such as alphabet letters, stuffed animals, simple shapes, or a combination of these or other items.

6. A system for an artist to display any number of objects created by the artist, which could include artwork created using various materials.

7. A system for collectors, such as collectors of certain types of memorabilia, to display any number of objects in a collection.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
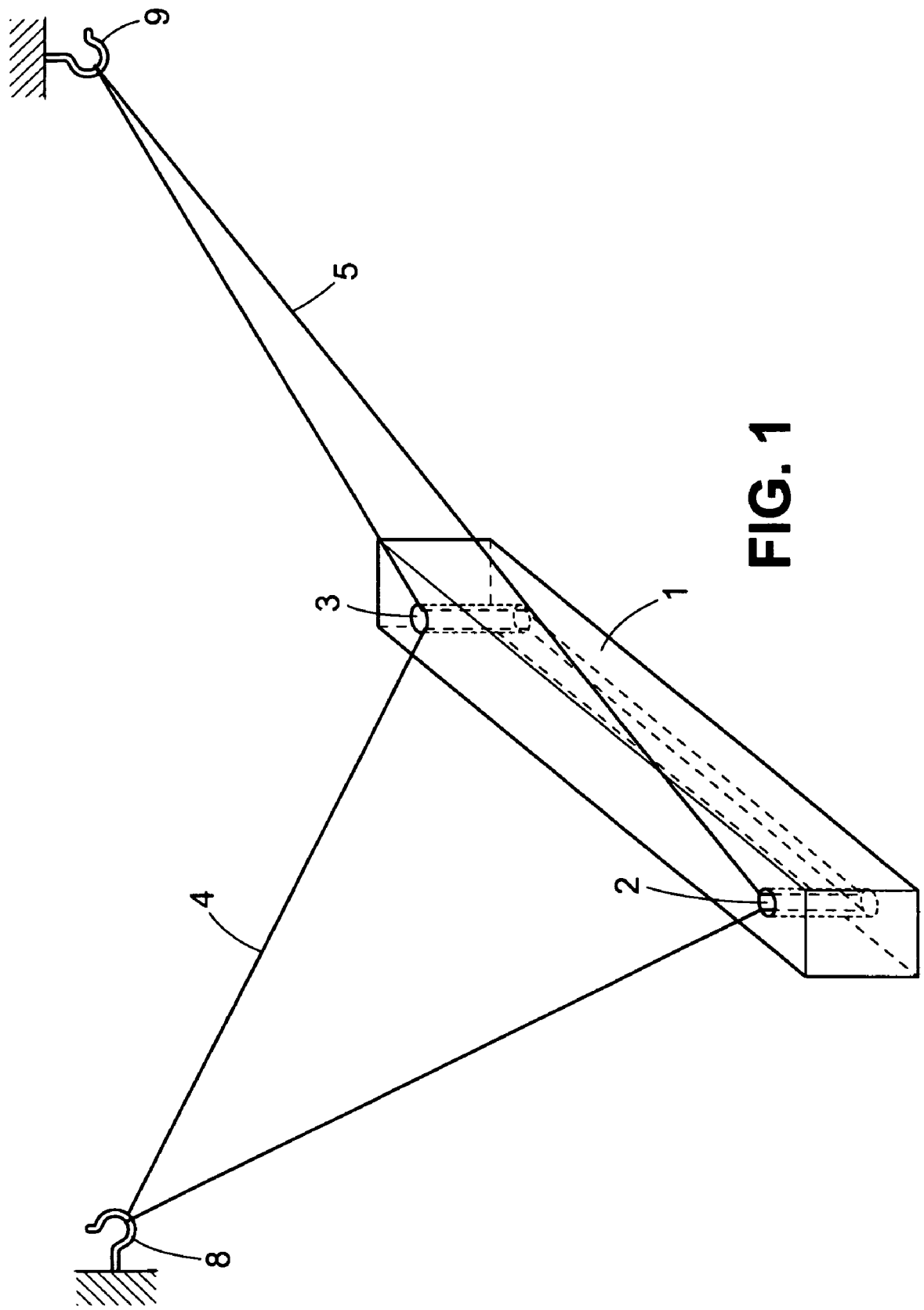
FIG. 1 is a perspective view of a representative object suspended by two cable loops which are restrained by two fixed hooking points as in the method of this invention.

The suspension system of this invention can be understood with reference to FIG. 1 which shows a representative object 1 suspended by two continuous cable loops, 4 and 5, which are threaded through two holes, 2 and 3, in object 1 and hooked over two fixed hooking points, 8 and 9. Object 1 is shown as a transparent object so that loops 4 and 5 can be followed along their entire length including the portions within holes 2 and 3 and the sections underneath object 1 between holes 2 and 3. If object 1 is a maximum of several pounds in weight, loops 4 and 5 can consist of lengths of string such as cotton or nylon. Holes 2 and 3 are sufficiently large that loops 4 and 5 can be moved independently of each other; also, sufficient friction between loops 4 and 5 and object 1 is required to render object 1 motionless as suspended from hooks 8 and 9 in any orientation. The latter restriction is easily accommodated by the gravitational field on the surface of earth, an object of wood, and loops of cotton thread; obviously many other combinations of materials in a gravitational field will support the operation of this invention for a multitude of objects of a wide variety of shapes and sizes.

Figure 2:
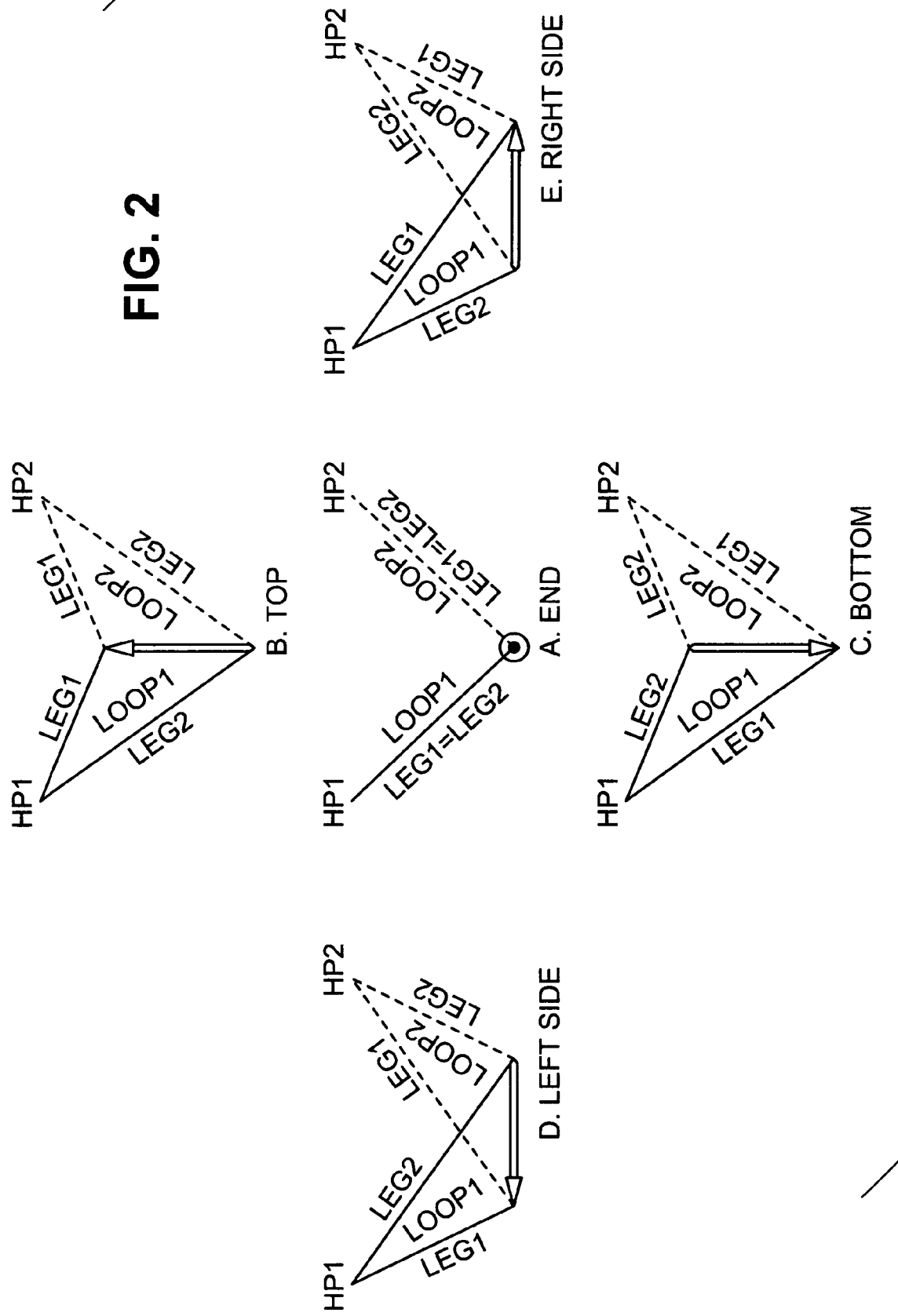
FIG. 2 is a set of five schematic drawings representing different orientations of an object suspended by two cable loops of this invention, all from the same view point and achieved by varying the lengths of the cable loop segments.

FIG. 2 is a set of five different drawings illustrating the range of different orientations of an object (here represented as a shaft with an arrow on one end) that are achievable simply by varying the relative lengths of loop segments (legs) from an object to a hooking point. For simplicity, the two loops are shown as the same size, and the hooking points (HP1 and HP2) are at the same height. The holes that the loops go through are assumed schematically at the extreme ends of the object for simplicity. It is immaterial if the leg lengths shown are achieved by sliding the cables through the holes in the object, moving the cables over the hooking points, or a combination of both techniques. In illustration A, the view point is such that the viewer sees a back end view of the object with the legs of each loop adjusted to the same size. This view point remains constant for illustrations A-E as the relative lengths of loop legs are varied. In B, the top of the object is visible by making LEG2>LEG1 for both loops. In C, the bottom of the object is visible by making LEG1>LEG2 for both loops. In D, the left side is revealed by making LEG2>LEG1 for LOOP1 while simultaneously making LEG1>LEG2 for loop 2. In E, the right side is visible by making LEG1>LEG2 for LOOP1 while simultaneously making LEG2>LEG1 for LOOP2. Obviously other orientations intermediate to the ones shown are also achievable.

Figure 3:
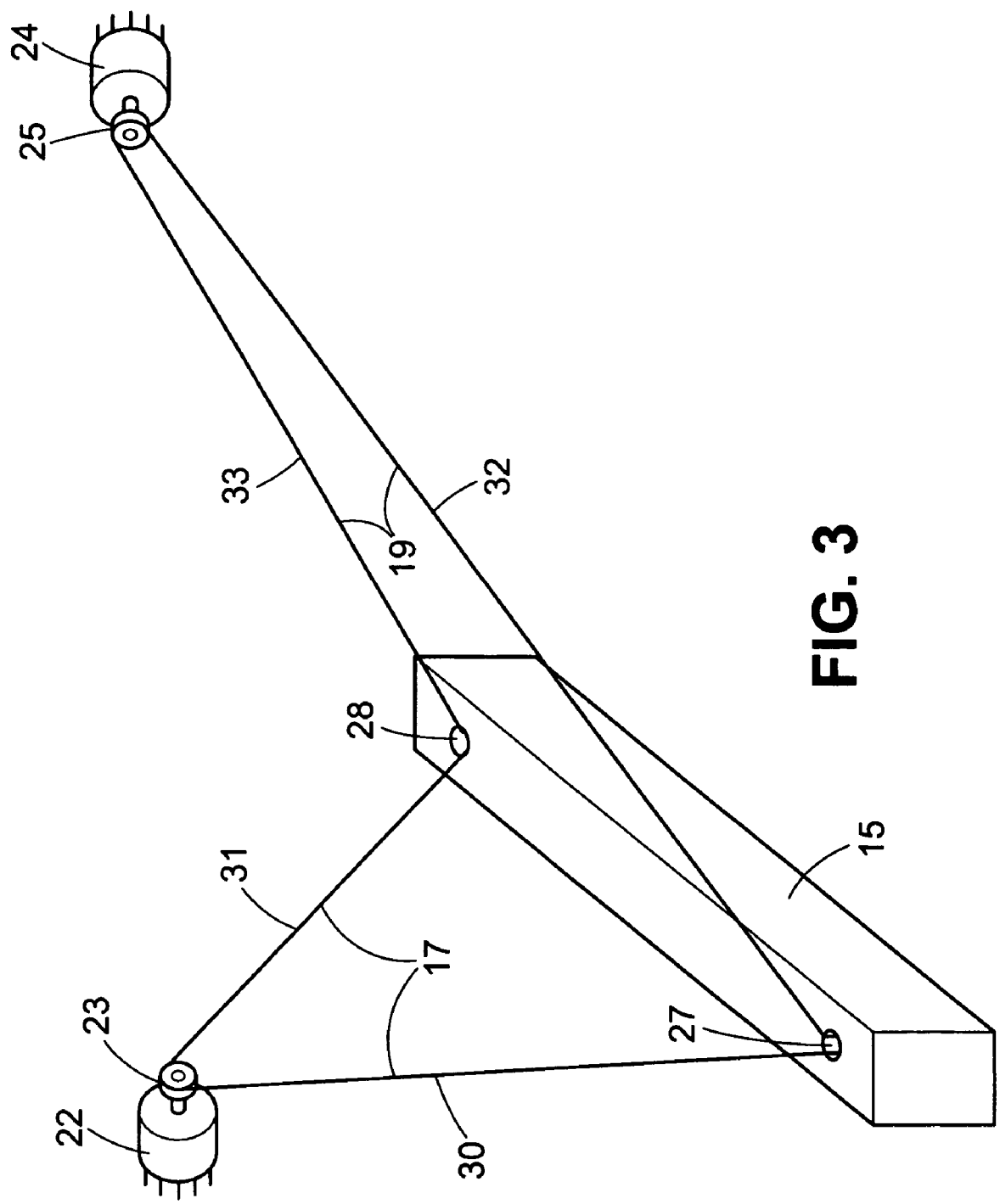
FIG. 3 is a perspective view of an alternate embodiment of this invention substituting two motorized pulleys for the hooking points shown in FIG. 1.

In an alternate embodiment, the hooking points are replaced by motorized pulleys. This arrangement is shown in FIG. 3. Object 15 is suspended by loops 17 and 19 which are engaged over pulleys 23 and 25 respectively. Fixed motors 22 and 24 can rotate pulleys 23 and 25 in either direction. Through holes 27 and 28 in the top surface of object 15 to accommodate complete loops 17 and 19 which then continue along the bottom surface of object 15. It is assumed that loops 17 and 19 would not slide through object 15 while being moved by pulleys 23 or 25. As described in FIG. 2, the orientation of object 15 is determined by the relative lengths of loop segments 30 and 31 on loop 17 and 32 and 33 on loop 19 whether the loops terminate at points 27 and 28 or go through object 15. Motors 22 and 24 would typically be stepper motors or DC gearmotors. If slippage of cable over pulley is encountered, an extra loop of cable can be wound over the pulley; the flanged pulley would then move the cable more securely using a windlass technique whereby more cable area is in contact. Using motors, both can be operated at desired speeds and directions simultaneously to create smooth continuous changes in object orientation.

Figure 4:
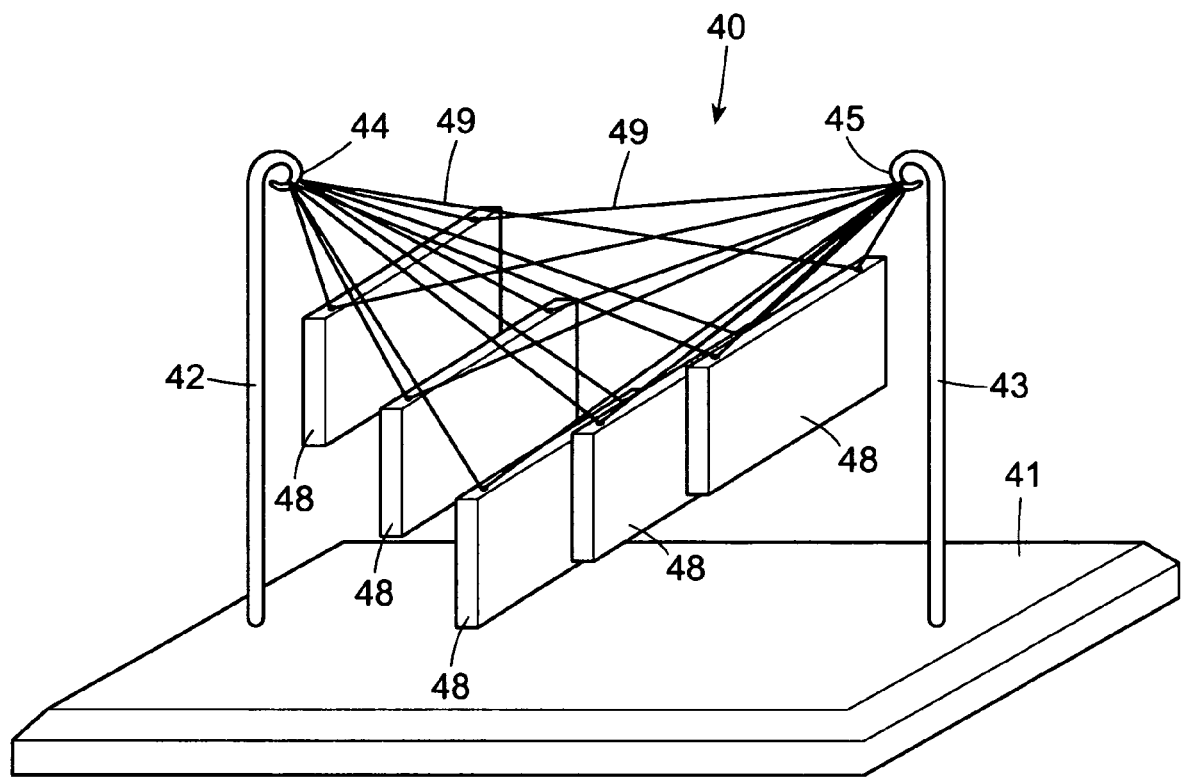
FIG. 4 is a perspective view of an executive toy using the principles of this invention.
Figure 5:
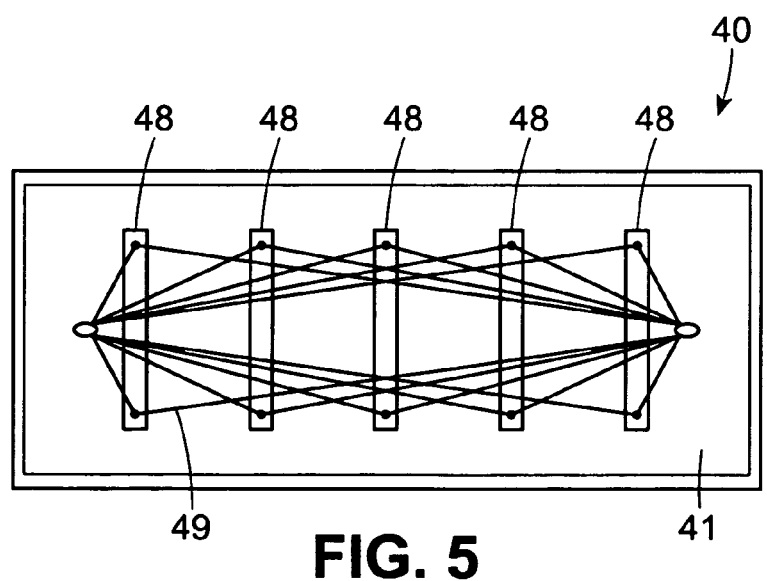
FIG. 5 is a top view of the executive toy of FIG. 4.

In a further alternate embodiment shown in FIG. 4, a number of metal bars 48 are suspended from loops 49 which engage each bar 48 through two vertical holes adjacent opposite ends and on the top of each bar. Executive toy 40 further consists of base 41 which supports upright columns 42 and 43 terminating at hooking points 44 and 45 respectively at their distal ends. Loops 49 may be of different lengths as shown; they are supported at hooking points 44 and 45. Although a symmetric arrangement is shown, the position of each bar 48 on its respective loop 49 can be varied. FIG. 5 shows the interesting top view of the loop pattern in a symmetric arrangement. Attractive materials such as gold plated bars and finely finished wooden bases can be used.

Figure 6:
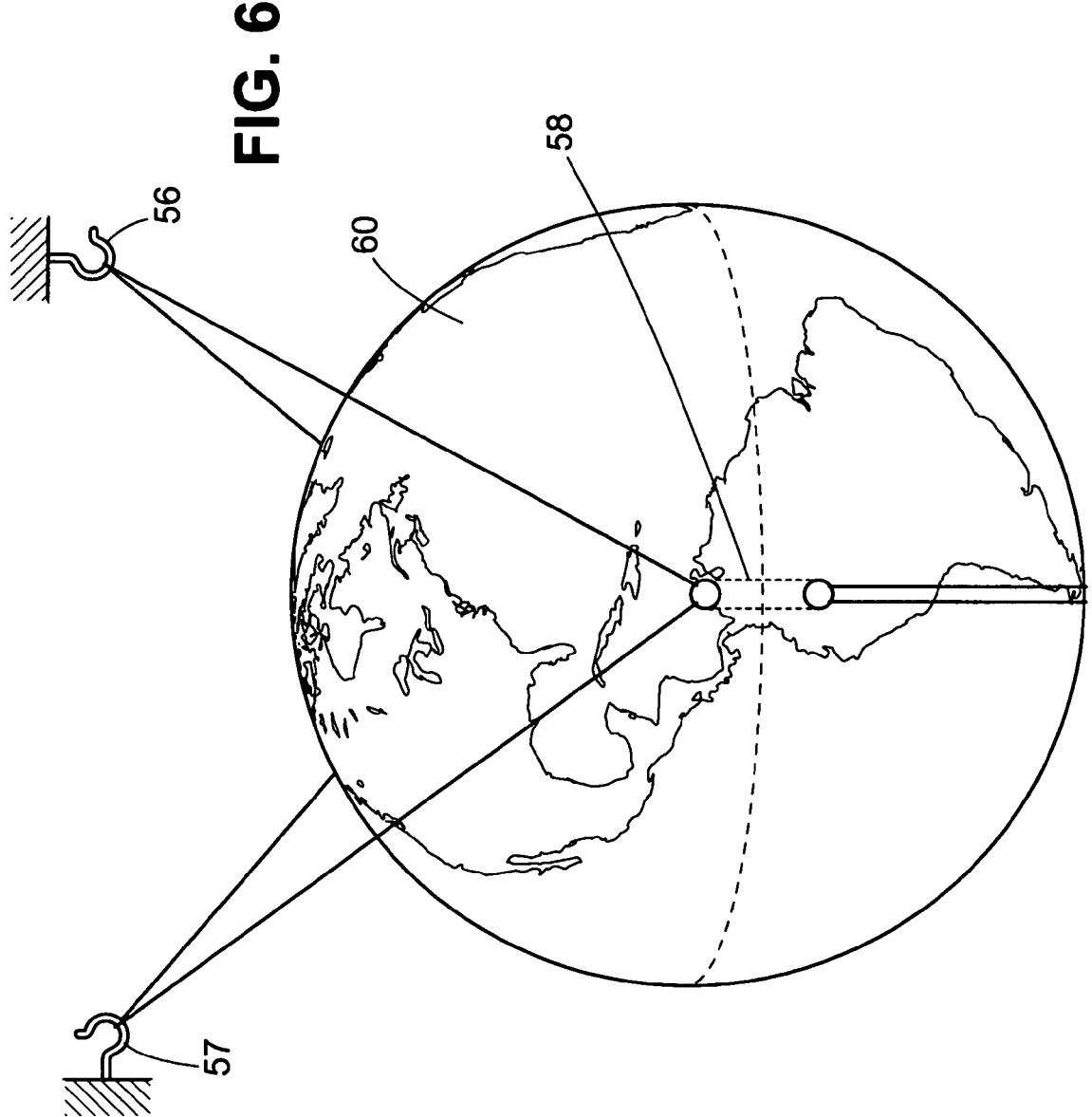
FIG. 6 is a side elevation of a globe representing the earth suspended by two loops as taught by this invention.

FIG. 6 shows a globe, as often used in Earth Science, suspended from two loops formed from cable A and cable B which are hooked at hooking points 56 and 57 respectively. Cables A and B are threaded through vertical holes 58 (only one shown) at opposite sides of globe 60. With this arrangement, globe 60 can be oriented in a variety of positions manually as shown, or motorized pulleys as in FIG. 3 can be used. It would remain in the desired orientation after positioning. This can form a model that demonstrates earth's motions. In particular, the apparent motion of a vertical ray of sunlight striking the earth's surface during the course of a year can simulate seasonal changes.

Another useful application of this invention is to suspend a camera itself or attach a camera to an object such as the suspended block of FIG. 1. This, too, has educational applications especially for nature photography. For example, the camera can be oriented to point to a bird's nest, or it can follow the path of a slow moving turtle.

A further application is the suspension of multiple large objects to form a mutable sculpture to hang in the lobby or other area of a building. Steel cables can be used, if required for strength, to accommodate the weight of heavy components. In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. An omnipositional cable-suspension system comprising:
   a) an inanimate object;
   b) a pair of holes passing through said object, said holes being spaced from each other;
   c) a first closed cable loop passing through both of said holes and a first hooking point for supporting said first closed cable loop, said first closed cable loop movable within said holes;
   d) a second closed cable loop independent of said first closed cable loop passing through both of said holes and a second hooking point spaced from said first hooking point for supporting said second closed cable loop, said second closed cable loop movable within said holes, whereby said first and second closed cable loops are movable independently of each other and said object is repositionable while maintaining stability in any selected position and spatial orientation without changing the cable-suspension system of the object.

2. The cable-suspension system as in claim 1 further comprising at least one of said closed cable loops passing through at least one further hooking point.

3. The cable-suspension system of claim 1 in which said holes are at or adjacent to opposite ends of said object.

4. The cable-suspension system of claim 1 in which said holes are axially parallel to each other.

5. The cable-suspension system of claim 1 in which the loops are of the same length.

6. The cable-suspension system of claim 1 in which the loops are of different length.

7. The cable-suspension system of claim 1 in which multiple inanimate objects are suspended, each object with separate loops, but sharing one or both of said hooking points.

8. The cable-suspension system of claim 1 in which said object has a linear edge.

9. The cable-suspension system of claim 1 in which said object is a sphere.

10. The cable-suspension system as in claim 1 in which said object is a caricature.

11. The cable-suspension system as in claim 1 in which said object has at least one irregular surface.

12. The cable-suspension system as in claim 1 in which said object is a component of a suspended sculpture.

13. The cable-suspension system as in claim 9 in which said sphere is a spherical model of a planet, said cable-suspension system further comprising a source of light being a model of a source of sunlight in an earth science teaching tool kit.

14. The cable-suspension system as in claim 1 in which said object suspends a camera in a fixed position in space for a first predetermined time, said object being movable to reposition said camera for a further predetermined time.

15. The cable-suspension system of claim 7 in which said plurality of objects is an executive toy and said pair of cables are suspended upon a base.

* * * * *